United States Patent
Kobayashi et al.

(10) Patent No.: US 6,461,531 B2
(45) Date of Patent: Oct. 8, 2002

(54) MN-ZN FERRITE AND PRODUCTION PROCESS THEREOF

(75) Inventors: Osamu Kobayashi; Osamu Yamada; Kiyoshi Ito, all of Shizuoka-ken (JP)

(73) Assignee: Minebea Co., Ltd., Kitasaku-gun (JP)

( * ) Notice: Subject to any disclaimer, the term of this patent is extended or adjusted under 35 U.S.C. 154(b) by 27 days.

(21) Appl. No.: 09/795,116

(22) Filed: Mar. 1, 2001

(65) Prior Publication Data

US 2001/0036895 A1 Nov. 1, 2001

(30) Foreign Application Priority Data

Mar. 22, 2000 (JP) ........................................ 2000-080207

(51) Int. Cl.[7] .......................... C04B 35/26; C04B 35/38; C10G 49/00

(52) U.S. Cl. ................................ 252/62.59; 252/62.56; 423/594; 501/126; 501/133; 501/134; 501/154

(58) Field of Search ........................... 252/62.56, 62.59; 501/134, 154, 126, 133; 423/594

(56) References Cited

FOREIGN PATENT DOCUMENTS

| DE | 11 77 538 B | 9/1964 |
|---|---|---|
| EP | 0 980 857 A1 | 2/2000 |
| GB | 1 304 237 A | 1/1973 |
| JP | A 7-230909 | 8/1995 |
| JP | A 9-180925 | 7/1997 |
| JP | A 10-208926 | 8/1998 |
| JP | A 11-199235 | 7/1999 |
| JP | A 2000-128541 | 5/2000 |
| JP | A 2000-133510 | 5/2000 |
| JP | A 2000-353613 | 12/2000 |

OTHER PUBLICATIONS

Welch et al., "Polycrystalline MnZn ferrite films prepared by pulsed laser deposition", Materials Letters, vol. 29, No. 4/06, Dec. 1, 1996.

Rao et al., "Magnetic and microstructural properties of Sn/Nb substituted Mn–Zn ferrites", J. Alloys and Compounds, vol. 282, 1999, pp. 268–273 no month.

Application S.N. 09/442,382, Kobayashi et al., filed Nov. 18, 1999.

Primary Examiner—Elizabeth D. Wood
(74) Attorney, Agent, or Firm—Oliff & Berridge, PLC

(57) ABSTRACT

The present invention provides a Mn—Zn ferrite having an electrical resistivity exceeding 1 Ωm order and having a low core loss in a high frequency region exceeding 1 MHz. The basic component composition of the Mn—Zn ferrite includes 44.0 to 49.8 mol % $Fe_2O_3$, 6.0 to 15.0 mol % ZnO (15.0 mol % is excluded), 0.1 to 4.0 mol % at least one of $TiO_2$ and $SnO_2$, and remainder MnO, wherein desired results are obtained by limiting $Fe_2O_3$ content to less than 50 mol % that is the stoichiometric composition and adding a proper amount of $TiO_2$ or $SnO_2$ and further controlling its average grain size to less than 10 μm.

7 Claims, No Drawings

MN-ZN FERRITE AND PRODUCTION PROCESS THEREOF

BACKGROUND OF THE INVENTION

1. Field of the Invention

The present invention relates to an oxide magnetic material having soft magnetism, and more specifically to a Mn—Zn ferrite suitable for use as a switching power transformer, a rotary transformer and the like, and to a production process thereof.

2. Description of the Related Art

Typical oxide magnetic materials having soft magnetism include a Mn—Zn ferrite. Conventionally, this Mn—Zn ferrite usually has a basic component composition containing 52 to 55 mol % $Fe_2O_3$ on the average, exceeding 50 mol % which is the stoichiometric composition, 10 to 24 mol % ZnO and remainder MnO. The Mn—Zn ferrite is usually produced by mixing respective material powders of $Fe_2O_3$, ZnO and Mno in a prescribed ratio, subjecting the mixed powders to respective steps of calcination, milling, component adjustment, granulation and pressing to obtain a desired shape, then performing sintering treatment at 1200 to 1400° C. for 2 to 4 hours in a reducing atmosphere in which a relative partial pressure of oxygen is controlled to a low level by supplying nitrogen. The Mn—Zn ferrite is sintered in the reducing atmosphere in order to reduce a part of $Fe^{3+}$ thereby forming $Fe^{2+}$. This $Fe^{2+}$ has positive crystal magnetic anisotropy and cancels negative crystal magnetic anisotropy of $Fe^3$ to thereby enhance soft magnetism.

Amount of the above-mentioned $Fe^{2+}$ formed depends on relative partial pressures of oxygen in sintering and cooling after the sintering. Therefore, when the relative partial pressure of oxygen is improperly set, it becomes difficult to ensure excellent soft magnetic properties. Thus, conventionally, the following expression (1) has been experimentally established and the relative partial pressure of oxygen in sintering and in cooling after the sintering has been strictly controlled in accordance with this expression (1).

$$\log Po_2 = -14540/(T+273) + b \tag{1}$$

where T is temperature (° C.), $Po_2$ is a relative partial pressure of oxygen, and b is a constant which is usually 7 to 8. The fact that the constant b is set to 7 to 8 means that the relative partial pressure of oxygen in the sintering must be controlled in a narrow range, whereby such a problem arises that the sintering treatment becomes significantly troublesome and therefore production costs are increased.

In recent years, with miniaturization and performance improvement of electronic equipments there is such an increasing tendency that signals are processed at a higher frequency. Thus, a magnetic material having excellent magnetic properties even in a higher frequency region as well has been needed However, when the Mn—Zn ferrite is used as a magnetic core material, an eddy current flows in a higher frequency region applied resulting in a larger loss. Therefore, in order to extend an upper limit of the frequency at which the Mn—Zn ferrite can be applied as a magnetic core material, an electrical resistivity of the material must be made as high as possible. However, since the above-mentioned general Mn—Zn ferrite contains $Fe_2O_3$ in an amount larger than 50 mol % which is the stoichiometric composition, a large amount of $Fe^{2+}$ ion is present, thereby making easy the transfer of electrons between the above-mentioned $Fe^{3+}$ and $Fe^{2+}$ ions. Thus, the electrical resistivity of the Mn—Zn ferrite is in the order of 1 Ωm or less. Accordingly, an applicable frequency is limited to about several hundred kHz maximum, and in a frequency region exceeding the limit, permeability (initial permeability) is significantly lowered to completely take away properties of the soft magnetic material.

In order to increase an apparent resistance of the Mn—Zn ferrite, in some cases, CaO, $SiO_2$ or the like is added as additive to impart a higher resistance to grain boundary and at the same time the Mn—Zn ferrite is sintered at as low as about 1200° C. to diminish the grain size from its usual dimension, about 20 μm, to 5 μm, thereby taking measures to increase the ratio of the grain boundary. However, even if such measures are adopted, it is difficult to obtain an electrical resistivity exceeding 1 Ωm order as the grain boundary itself has a low resistance, and the above-mentioned measures fall short of a thorough solution.

Further, a Mn—Zn ferrite to which, for example, CaO, $SiO_2$, $SnO_2$ and $TiO_2$ are added to obtain a higher resistivity has been developed and is disclosed in Japanese Patent Application No. Hei 9-180925. However, the electrical resistivity of the Mn—Zn ferrite is as low as 0.3 to 2.0 Ωm, which does not sufficiently satisfy application in a high frequency region. Further, a Mn—Zn ferrite to which $SnO_2$ and the like are added is disclosed in EPC 1,304,237. The Mn—Zn ferrite described in this EPC patent contains as much as 3 to 7 mol % $Fe^{2+}$. An electrical resistivity depends on amount of $Fe^{2+}$ as described above. Therefore, the electrical resistivities of the Mn—Zn ferrite in this EPC patent cannot exceed the electrical resistivities of a usual Mn—Zn ferrite of the prior art.

On the other hand, a Mn—Zn ferrite which contains less than 50 mol % $Fe_2O_3$ for a higher resistance has been developed for use as a core material for a deflecting yoke and is disclosed in Japanese Patent Laid-open Nos. Hei 7-230909, Hei 10-208926, Hei 1-99235 and the like.

However, judging from the fact that the application thereof is a core material for a deflecting yoke and from examples of the invention described in each publication, the Mn—Zn ferrites described in any of the above publications are ferrite materials intended to be used in a frequency region of 64 to 100 kHz. It is described that the purpose in setting $Fe_2O_3$ content to 50 mol % or less for a high electrical resistivity is to enable a copper wire to be wound directly around a core for a deflecting yoke. Excellent magnetic properties are not obtained in such a high frequency region as exceeding 1 MHz. Thus, only setting the $Fe_2O_3$ content to less than 50 mol % for a high electrical resistivity is not good enough to enable the ferrites to be used as a magnetic core material in such a high frequency region as exceeding 1 MHz.

SUMMARY OF THE INVENTION

The present invention has been made in consideration of the above-mentioned conventional problems. An object of the present invention is to provide a Mn—Zn ferrite that has, of course, excellent magnetic properties, and also has both a higher electrical resistivity than 1 Ωm order (a single digit order) and a low core loss in such a high frequency region as exceeding 1 MHz, and a production process by which such a Mn—Zn ferrite can be obtained easily and inexpensively.

A Mn—Zn ferrite according to the present invention to attain the above-mentioned object is characterized in that its basic component composition includes 44.0 to 49.8 mol % $Fe_2O_3$, 6.0 to 15.0 mol % ZnO (15.0 mol % is excluded), 0.1 to 4.0 mol % at least one of $TiO_2$ and $SnO_2$, and remainder MnO, and that the average grain size is less than 10 μm.

Another Mn—Zn ferrite according to the present invention is characterized in that its basic component composition includes 44.0 to 49.8 mol % $Fe_2O_3$, 6.0 to 15.0 mol % ZnO (15.0 mol % is excluded), 0.1 to 4.0 mol % at least one of $TiO_2$ and $SnO_2$, 0.1 to 6.0 mol % CuO, and remainder MnO, and that the average grain size is less than 10 μm.

Still another Mn—Zn ferrite according to the present invention may contain as additive, in addition to the basic component compositions of the above-described two inventions, at least one component selected from the group consisting of 0.005 to 0.200 mass % CaO, 0.005 to 0.050 mass % $SiO_2$, 0.010 to 0.200 mass % $ZrO_2$, 0.010 to 0.200 mass % $Ta_2O_5$, 0.010 to 0.200 mass % $HfO_2$ and 0.010 to 0.200 mass % $Nb_2O_5$.

On the other hand, a production process according to the present invention to attain the above-mentioned object is characterized in that a mixed powder whose components are adjusted so as to compose the above-mentioned Mn—Zn ferrite is pressed, then sintered and cooled, after the sintering, down to 500° C. or lower in an atmosphere of a relative partial pressure of oxygen defined by an arbitrary value selected from a range of 6 to 12 as a constant b in the expression (1).

DETAILED DESCRIPTION OF THE INVENTION

In a usual Mn—Zn ferrite of the prior art, $Fe_2O_3$ content is larger than 50 mol % that is the stoichiometric composition, as described above. In order to prevent this excessive $Fe_2O_3$ from getting precipitated as hematite, sintering and cooling must be conducted under a condition where a relative partial pressure of oxygen is reduced to a significantly lower level by flowing nitrogen, that is a condition where the constant b in the expression (1) is set to 7 to 8. On the other hand, since a Mn—Zn ferrite of the present invention contains 44.0 to 49.8 mol % $Fe_2O_3$, that is less than 50 mol %, hematite is hardly precipitated. Thus, even if a range of relative partial pressure of oxygen in sintering is somewhat increased, excellent magnetic properties can be obtained. Further, in the conventional Mn—Zn ferrite that contains more than 50 mol % $Fe_2O_3$, about 3.0 mol % $Fe^{2+}$ exists. On the other hand, in the Mn—Zn ferrite of the present invention, $Fe^{2+}$ content is as low as 0.1 to 0.7 mol %. Accordingly, the electrical resistivity of the Mn—Zn ferrite of the present invention is very high. Therefore, an eddy current is not increased so much even in a high frequency region, and excellent initial permeability can be obtained. However, if this $Fe_2O_3$ content is too small, saturation magnetization is deteriorated. Thus, at least 44.0 mol % $Fe_2O_3$ must be contained.

ZnO as main component influences the Curie temperature and saturation magnetization. Too small amount of ZnO reduces the initial permeability, but on the contrary too large amount of ZnO lowers the saturation magnetization and Curie temperature. Since ferrite for power transformer is often used in an environment at a temperature of about 80 to 100° C., it is particularly important that the ferrite has a high Curie temperature and high saturation magnetization. Accordingly, ZnO content in the ferrite is set to the above-mentioned range of 6.0 to 15.0 mol % (15.0 mol % is excluded).

Ti and Si receive an electron from $Fe^{3+}$ to thereby form $Fe^{2+}$. Therefore, amount of $Fe^{2+}$ formation can be inhibited by controlling $TiO_2$ or $SnO_2$ content and relative partial pressure of oxygen in sintering and cooling after the sintering. The existing ratio of $Fe^{3+}$ to $Fe^{2+}$ is optimized to cancel out positive and negative crystal magnetic anisotropies with the result that the ferrite has excellent soft magnetism. However, when the $TiO_2$ or $SnO_2$ content is too small, the effect is small, whereas initial permeability is lowered when the content is too large. Thus, the $TiO_2$ or $SnO_2$ content is set within a range of from 0.1 to 4.0 mol %.

In the present invention, CuO may be contained additionally as a main component. This CuO has an effect of enabling the ferrite to be sintered at a low temperature. However, if CuO content is too small, the effect is small. On the contrary if the CuO content is too large, core loss increases. Accordingly, the CuO content is set to 0.1 to 0.6 mol %.

In the present invention, CaO, $SiO_2$, $ZrO_2$, $Ta_2O_5$, $HfO_2$ or $Nb_2O_5$ can be contained as additive. These additives have an action of accelerating crystal grain growth and are effective in keeping average grain size less than 10 μm. However, if their content is too small, the effect is small, and on the contrary if the content is too large, grains grow abnormally. Thus, CaO content is set to 0.005 to 0.200 mass %, $SiO_2$ content is set to 0.005 to 0.050 mass %, $ZrO_2$ content is set to 0.010 to 0.200 mass %, $Ta_2O_5$ content is set to 0.010 to 0.200 mass %, $HfO_2$ content is set to 0.010 to 0.200 mass %, and $Nb_2O_5$ content is set to 0.010 to 0.200 mass %.

The core loss of ferrite in a high frequency region comprises mainly eddy-current loss and residual loss. As described above, the Mn—Zn ferrite according to the present invention has a very high electrical resistivity and a small eddy-current loss. Further, since the Mn—Zn ferrite has a small average grain size of less than 10 μm, number of magnetic domain walls in a crystal grain is decreased, whereby the residual loss can be significantly decreased.

In the present invention, as described above, the sintering and cooling after the sintering can be conducted in an atmosphere of the relative partial pressure of oxygen obtained using an arbitrary value in a range of 6 to 12 as the constant b in the expression (1). However, when a value larger than 12 is selected as the constant b, $Fe^{2+}$ is hardly formed with the result that core loss increases. On the contrary, when a value smaller than 6 is selected, the electrical resistivity is significantly lowered by the fact that amount of $Fe^{2+}$ increases.

In production of the Mn—Zn ferrite, respective raw material powders of $Fe_2O_3$, ZnO, $TiO_2$, $SnO_2$, CuO and MnO, which are main components, are previously weighed for a prescribed ratio and mixed to obtain a mixed powder, and then this mixed powder is calcined and finely milled. The temperature for calcination differs slightly depending on target compositions and an appropriate temperatures should be selected from a range of 800 to 1000° C. A general-purpose ball mill can be used for the fine milling of the calcined powder. When CaO, $SiO_2$, $ZrO_2$, $Ta_2O_5$, $HfO_2$ or $Nb_2O_5$ is made to be contained as additive, powders of these additives are added to the aforementioned fine milled powder in appropriate amounts and mixed with each other to obtain a mixture with a target composition. Then, the mixture is granulated and pressed in accordance with a usual ferrite production process, and then sintered at 1000 to 1400° C. In the granulation process, a method of adding a binder such as polyvinyl alcohol, polyacrylamide, methyl cellulose, polyethylene oxide or glycerin can be used, and in the pressing process, a method of applying a pressure of, for example, 80 MPa or more can be used.

In the above-mentioned sintering and cooling after the sintering, relative partial pressure of oxygen is adjusted by flowing inert gas such as nitrogen gas or the like into a sintering furnace. In this case, an arbitrary value can be selected from a range of 6 to 12 as the constant b in the expression (1), which provides a very wide allowance as compared to the constant b (7 to 8) selected in a case where a usual Mn—Zn ferrite of the prior art containing more than 50 mol % $Fe_2O_3$ is sintered, and the relative partial pressure of oxygen can be easily controlled. Further, in this case, since at a temperature of below 500° C., the reaction of oxidation or reduction can be neglected irrespective of relative partial pressure of oxygen, the cooling after the sintering needs to be conducted in accordance with the above-mentioned expression (1) only till the temperature gets down to 500° C.

component composition was checked by a fluorescent X ray analysis, and their electrical resistivity, initial permeability at 2 MHz, and core loss at 2 MHz-25 mT were measured. The results are shown together in Table 1.

TABLE 1

| Sample No. | Classification | Basic Component Composition (mol %) | | | | | Electrical Resistivity ($\Omega$m) | Initial Permeability | Core Loss (kW/m³) |
| --- | --- | --- | --- | --- | --- | --- | --- | --- | --- |
| | | $Fe_2O_3$ | MnO | ZnO | $TiO_2$ | $SnO_2$ | | | |
| 1-1 | Comparison | 51.0 | 36.7 | 12.2 | 0.1 | — | 0.9 | 30 | >3000 |
| 1-2 | Comparison | 50.2 | 37.3 | 12.4 | — | 0.1 | 1.1 | 40 | >3000 |
| 1-3 | Present Invention | 49.8 | 37.6 | 12.5 | — | 0.1 | 110 | 510 | 960 |
| 1-4 | Present Invention | 49.0 | 37.9 | 12.6 | — | 0.5 | 210 | 560 | 740 |
| 1-5 | Comparison | 47.0 | 39.8 | 13.2 | — | — | 290 | 280 | 1900 |
| 1-6 | Present Invention | 47.0 | 38.6 | 12.9 | 1.5 | — | 240 | 600 | 660 |
| 1-7 | Comparison | 47.0 | 36.0 | 12.0 | — | 5.0 | 250 | 290 | 1600 |
| 1-8 | Present Invention | 44.0 | 39.0 | 13.0 | 4.0 | — | 320 | 530 | 870 |
| 1-9 | Comparison | 42.0 | 42.4 | 14.1 | — | 1.5 | 400 | 380 | 1590 |

As apparent from the results shown in Table 1, all the samples 1-3 to 1-9 each containing less than 50 mol % $Fe_2O_3$ had a significantly higher electrical resistivity than the comparative samples 1-1 and 1-2 each containing more than 50 mol % $Fe_2O_3$. Further, out of these samples, the samples 1-3, 1-4, 1-6 and 1-8 of the present invention containing 44.0 to 49.8 mol % $Fe_2O_3$ and 0.1 to 4.0 mol % $TiO_2$ or $SnO_2$ obtained an excellent value of 1000 kW/m³ or less for the core loss.

EXAMPLES

Example 1

Respective raw material powders of $Fe_2O_3$, $TiO_2$ (or $SnO_2$), MnO and ZnO were weighed for a composition consisting of 42.0 to 51.0 mol % $Fe_2O_3$, 0 to 5.0 mol % $TiO_2$ or $SnO_2$ and the remainder including MnO and ZnO with a molar ratio of MnO to ZnO being 3:1, and mixed with a ball mill. Then, the mixed powder was calcined in the air at 850° C. for 2 hours and milled with a ball mill for 20 hours to thereby obtain a fine milled powder. The component of this fine milled powder was adjusted so as to obtain the composition above-mentioned and the adjusted mixture was further mixed with a ball mill for 1 hour. Then, this mixture was granulated with addition of polyvinyl alcohol, and pressed at a pressure of 80 MPa into toroidal cores (green compacts) having an outer diameter of 18 mm, an inner diameter of 10 mm and a height of 4 mm. The green compacts were placed in a sintering furnace where an atmosphere was adjusted by flowing nitrogen so that it has a relative partial pressure of oxygen as obtained by setting the constant b to 8 in the expression (1). Sintering at 1200° C. for 2 hours and cooling after the sintering were then conducted in the above atmosphere adjusted and samples 1-1 to 1-9 as shown in Table 1 were obtained.

Regarding the above-obtained respective samples 1-1 to 1-9, average grain size was measured by observation with a metallurgical microscope. The results showed the average grain sizes of all the samples were about 7 μm. Additionally, regarding the above-mentioned samples 1-1 to 1-9, final

Example 2

Respective raw material powders were weighed so as to have the same composition as the sample 1-6 of Example 1, mixed with a ball mill, and pressed into toroidal cores (green compacts) each having an outer diameter of 18 mm, an inner diameter of 10 mm and a height of 4 mm under the same conditions as in Example 1. The green compacts were placed into a sintering furnace where an atmosphere was adjusted by flowing nitrogen so that it has a relative partial pressure of oxygen as obtained by changing variously the constant b in the expression (1) within a range of 5.5 to 15. Sintering at 1200° C. for 2 hours and cooling after the sintering were then conducted in the above atmosphere adjusted and samples 2-1 to 2-5 as shown in Table 2 were obtained.

Regarding the samples 2-1 to 2-5, average grain size was measured by observation with a metallurgical microscope. The result was that the average grain sizes of all the samples were about 7 μm. Additionally, regarding the above-mentioned samples 2-1 to 2-5, their electrical resistivity and core loss at 2 MHz-25 mT were measured. The results are shown together in Table 2.

TABLE 2

| Sample No. | Classification | b Constant | Electrical Resistivity ($\Omega$m) | Core Loss (kW/m³) |
| --- | --- | --- | --- | --- |
| 2-1 | Comparison | 5.5 | 70 | 1270 |
| 2-2 | Present Invention | 6 | 180 | 910 |
| 2-3 | Present Invention | 9 | 290 | 680 |
| 2-4 | Present Invention | 12 | 350 | 950 |
| 2-5 | Comparison | 15 | 380 | 1310 |

As can be seen from the results shown in Table 2, all the samples 2-2 to 2-4 of the present invention which were sintered in the atmospheres of the relative partial pressures of oxygen obtained by setting the constant b to 6 to 12 in the expression (1) had a small core loss. However, both of the comparative sample 2-1 which was sintered in the atmosphere of relative partial pressure of oxygen obtained by setting the constant b to 5.5 and the comparative sample 2-5 for which the constant b was set to 15 had a large core loss of more than 1000 kW/m$^3$.

Example 3

Respective raw material powders of Fe$_2$O$_3$, TiO$_2$ (or SnO$_2$), CuO, MnO and ZnO were weighed for a composition consisting of 47.0 mol % Fe$_2$O$_3$, 1.5 mol % TiO$_2$ or SnO$_2$, 0 to 7.0 mol % CuO and the remainder including MnO and ZnO with a molar ratio of MnO to ZnO being 3:1, mixed with a ball mill, and pressed into toroidal cores (green compacts) each having an outer diameter of 18 mm, an inner diameter of 10 mm and a height of 4 mm under the same conditions as in Example 1. The green compacts were placed into a sintering furnace where an atmosphere was adjusted by flowing nitrogen so that it has a relative partial pressure of oxygen as obtained by setting the constant b to 8 in the expression (1). Sintering at 1100° C. and 1200° C. for 2 hours and cooling after the sintering were conducted in the above atmosphere adjusted and samples 3-1 to 3-4 as shown in Table 3 were obtained.

Regarding the samples 3-1 to 3-4, average grain size was measured by observation with a metallurgical microscope. The result was that the average grain sizes of all the samples were in a range of about 5 to 9 μm. Additionally, regarding the above-mentioned samples 3-1 to 3-4, final component composition was checked by a fluorescent X-ray analysis, and also their core loss at 2 MHz-25 mT was measured. The results are shown together in Table 3.

at 1100 to 1300° C. for 2 hours and cooling after the sintering were then conducted in the above atmosphere adjusted and samples 4-1 to 4-6 as shown in Table 4 were obtained.

Regarding the samples 4-1 to 4-6 thus obtained, average grain size was measured by observation with a metallurgical microscope, and also core loss at 2 MHz-25 mT was measured. The results are shown together in Table 4.

TABLE 4

| Sample No. | Classification | Basic Component Composition | Sintering Temperature (° C.) | Average Grain Size (μm) | Core Loss (kW/m$^3$) |
|---|---|---|---|---|---|
| 4-1 | Present Invention | Same as Sample 3-2 | 1100 | 6 | 690 |
| 4-2 | Present Invention | Same as Sample 3-2 | 1150 | 9 | 980 |
| 4-3 | Comparison | Same as Sample 3-2 | 1200 | 10 | 1060 |
| 4-4 | Present Invention | Same as Sample 1-6 | 1200 | 7 | 660 |
| 4-5 | Comparison | Same as Sample 1-6 | 1250 | 13 | 1140 |
| 4-6 | Comparison | Same as Sample 1-6 | 1300 | 18 | 1370 |

As can be seen from the results shown in Table 4, while the samples 4-1, 4-2 and 4-4 of the present invention each having a grain size of less than 10 μm had a low core loss of less than 1000 kW/m$^3$, the comparative samples 4-3, 4-5 and 4-6 each having a grain size of 10 μm or more had a large core loss of more than 1000 kW/m$^3$.

TABLE 3

| Sample No. | Classification | Basic Component Composition (mol %) | | | | | | Core Loss at each Sintering Temperature (kW/m$^3$) | |
|---|---|---|---|---|---|---|---|---|---|
| | | Fe$_2$O$_3$ | MnO | ZnO | TiO$_2$ | SnO$_2$ | CuO | 1200° C. | 1100° C. |
| 3-1 | Present Invention | 47.0 | 38.6 | 12.9 | 1.5 | — | — | 660 | 1220 |
| 3-2 | Present Invention | 47.0 | 36.4 | 12.1 | — | 1.5 | 3.0 | 960 | 690 |
| 3-3 | Present Invention | 47.0 | 34.1 | 11.4 | 1.5 | — | 6.0 | 1250 | 840 |
| 3-4 | Comparison | 47.0 | 33.4 | 11.1 | — | 1.5 | 7.0 | 1880 | 1410 |

As can be seen from Table 3, the sample 3-1 (sample of the present invention) containing no CuO had to be sintered at a temperature of 1200° C. to realize a low core loss of 1000 kW/m$^3$ or less. On the other hand, the samples 3-2 and 3-3 of the present invention each containing a proper amount of CuO, even when sintered at a low temperature of 1100° C., could obtain a low loss of 1000 kW/m$^3$ or less. However, the comparative sample 3-4 containing CuO exceeding the proper amount incurred an increase in the core loss regardless of the sintering temperature selected.

Example 4

Respective raw material powders were weighed so as to have the same composition as the sample 1-6 of Example 1 or the sample 3-2 of Example 3, mixed with a ball mill, and pressed into a toroidal cores (green compacts) each having an outer diameter of 18 mm, an inner diameter of 10 mm and a height of 4 mm under the same conditions as in Example 1. The green compacts were placed into a sintering furnace where an atmosphere was adjusted by flowing nitrogen so that it has a relative partial pressure of oxygen as obtained by setting the constant b to 8 in the expression (1). Sintering

Example 5

Respective raw material powders were weighed so as to have the same composition as the sample 1-6 of Example 1 or the sample 3-2 of Example 3, mixed with a ball mill, calcined in the air at 850° C. for 2 hours and milled in the ball mill for 20 hours to thereby obtain a fine milled powder. The component of this fine milled powder was adjusted so as to obtain the composition specified in the above, CaO, SiO$_2$, ZrO$_2$, Ta$_2$O$_5$, HfO$_2$ or Nb$_2$O$_5$ was added to the adjusted fine milled powder as additive, and the obtained mixture was further mixed with a ball mill for 1 hour. Then, this mixture was granulated with addition of polyvinyl alcohol, and pressed at a pressure of 80 MPa into toroidal cores (green compacts) each having an outer diameter of 18 mm, an inner diameter of 10 mm and a height of 4 mm. The green compacts were placed into a sintering furnace where an atmosphere was adjusted by flowing nitrogen so that it has a relative partial pressure of oxygen as obtained by setting the constant b to 8 in the expression (1). Sintering at 1100 to 1200° C. for 2 hours and cooling after the sintering were then conducted in the above atmosphere adjusted and samples 5-1 to 5-8 as shown in Table 5 were obtained.

Regarding the samples 5-1 to 5-8 thus obtained, average grain size was measured by observation with a metallurgical microscope, and also core loss at 2 MHz-25 mT was measured. The results are shown together in Table 5.

TABLE 5

| Sample No. | Classification | Additive (mol %) | Basic Component Composition | Sintering Temperature (° C.) | Average Grain Size (μm) | Core Loss (kW/m³) |
|---|---|---|---|---|---|---|
| 3-2 | Present Invention | — | Refer to Table 3 | 1100 | 7 | 690 |
| 5-1 | Present Invention | Nb₂O₅ 0.050 | Same as Sample 3-2 | 1100 | 4 | 660 |
| 5-2 | Present Invention | HfO₂ 0.050 | Same as Sample 3-2 | 1100 | 5 | 660 |
| 5-3 | Present Invention | SiO₂ 0.005 | Same as Sample 3-2 | 1100 | 5 | 640 |
| 1-6 | Present Invention | — | Refer to Table 1 | 1200 | 7 | 660 |
| 5-4 | Present Invention | Ta₂O₅ 0.050 | Same as Sample 1-6 | 1200 | 5 | 620 |
| 5-5 | Present Invention | ZrO₂ 0.050 | Same as Sample 1-6 | 1200 | 5 | 600 |
| 5-6 | Present Invention | CaO 0.005 | Same as Sample 1-6 | 1200 | 6 | 630 |
| 5-7 | Present Invention | CaO 0.200 | Same as Sample 1-6 | 1200 | 3 | 640 |
| 5-8 | Comparison | CaO 0.300 | Same as Sample 1-6 | 1200 | 3 | 1290 |

As can be seen from Table 5, all the samples 5-1 to 5-7 of the present invention to each of which a suitable amount of additive was added had a restrained grain growth and a further decreased core loss compared to the samples 1-6 and 3-2 (sample of the present invention) to each of which no additive was added. However, the comparative sample 5-8 to which an excess amount of additive was added had an abnormal grain growth thereby incurring a significant deterioration in the core loss.

As described above, the Mn—Zn ferrite of the present invention containing 44.0 to 49.8 mol % $Fe_2O_3$ which is less than the stoichiometric composition and 0.1 to 4.0 mol % $TiO_2$ or $SnO_2$ and further having its average grain size set to less than 10 μm has not only a high electrical resistivity exceeding 1 Ωm order but also a low core loss in a high frequency region exceeding 1 MHz, and further excellent magnetic properties, thereby enhancing the utility significantly.

Further, when 0.1 to 6.0 mol % of CuO is contained as a main component, sintering can be performed at a low temperature, whereby the energy consumption can be reduced to a minimum.

Further, when a proper amount of CaO, $SiO_2$, $ZrO_2$, $Ta_2O_5$, $HfO_2$, $Nb_2O_5$ or the like is contained as additive, the core loss in a high frequency region is further decreased.

In addition, according to the production process of the Mn—Zn ferrite of the present invention, a relative partial pressure of oxygen does not have to be strictly controlled during and after sintering, thus largely contributing to stabilization and cost reduction in the production of the Mn—Zn ferrite.

What is claimed is:

1. A Mn—Zn ferrite, characterized in that its basic component composition comprises: 44.0 to 49.8 mol % $Fe_2O_3$; 6.0 to 15.0 mol % ZnO (15.0 mol % is excluded); 0.1 to 0.4 mol % at least one of $TiO_2$ and $SnO_2$; and remainder MnO, and that its average grain size is less than 10 μm.

2. A Mn—Zn ferrite, characterized in that its basic component composition comprises: 44.0 to 49.8 mol % $Fe_2O_3$; 6.0 to 15.0 mol % ZnO (15.0 mol % is excluded); 0.1 to 0.4 mol % at least one of $TiO_2$ and $SnO_2$; 0.1 to 6.0 mol % CuO; and remainder MnO, and that its average grain size is less than 10 μm.

3. The Mn—Zn ferrite according to claim 1, further comprising as additive at least one component selected from the group consisting of: 0.005 to 0.200 mass % CaO; 0.005 to 0.050 mass % $SiO_2$; 0.010 to 0.200 mass % $ZrO_2$; 0.010 to 0.200 mass % $Ta_2O_5$; 0.010 to 0.200 mass % $HfO_2$; and 0.010 to 0.200 mass % $Nb_2O_5$.

4. A production process of Mn—Zn ferrite, characterized in that a mixed powder whose components are adjusted so as to obtain the composition of the Mn—Zn ferrite according to claim 1, is pressed, then sintered and cooled, after the sintering, down to 500° C. or lower in an atmosphere of a relative partial pressure of oxygen defined as the following expression:

$$\log Po_2 = -14540/(T+273) + b$$

where T is temperature (° C.), $Po_2$ is a relative partial pressure of oxygen, and b is a constant selected from a range of 6 to 12.

5. The Mn—Zn ferrite according to claim 2, further comprising as additive at least one component selected from the group consisting of: 0.005 to 0.200 mass % CaO; 0.005 to 0.050 mass % $SiO_2$; 0.010 to 0.200 mass % $ZrO_2$; 0.010 to 0.200 mass % $Ta_2O_5$; 0.010 to 0.200 mass % $HfO_2$; and 0.010 to 0.200 mass % $Nb_2O_5$.

6. A production process of Mn—Zn ferrite, characterized in that a mixed powder whose components are adjusted so as to obtain the composition of the Mn—Zn ferrite according to claim 2, is pressed, then sintered and cooled, after the sintering, down to 500° C. or lower in an atmosphere of a relative partial of oxygen defined as the following expression:

$$\log Po_2 = -14540/(T+273) + b$$

where T is temperature (° C.), $Po_2$ is a relative partial pressure of oxygen, and b is a constant selected from a range of 6 to 12.

7. A production process of Mn—Zn ferrite, characterized in that a mixed powder whose components are adjusted so as to obtain the composition of the Mn—Zn ferrite according to claim 3, is pressed, then sintered and cooled, after the sintering, down to 500° C. or lower in an atmosphere of a relative partial pressure of oxygen defined as the following expression:

$$\log Po_2 = -14540/(T+273) + b$$

where T is temperature (° C.), $Po_2$ is a relative partial pressure of oxygen, and b is a constant selected from a range of 6 to 12.

* * * * *

UNITED STATES PATENT AND TRADEMARK OFFICE
CERTIFICATE OF CORRECTION

PATENT NO. : 6,461,531 B2 Page 1 of 1
APPLICATION NO. : 09/795116
DATED : October 8, 2002
INVENTOR(S) : Osamu Kobayashi, Osamu Yamada and Kiyoshi Ito It is certified that error appears in the above-identified patent and that said Letters Patent is hereby corrected as shown below:

Column 10, line 1, change "0.1 to 0.4" to --0.1 to 4.0--.

Column 10, line 6, change "0.1 to 0.4" to --0.1 to 4.0--.

Signed and Sealed this

Nineteenth Day of September, 2006

JON W. DUDAS
*Director of the United States Patent and Trademark Office*